US012321812B1

(12) United States Patent
Barkan et al.

(10) Patent No.: US 12,321,812 B1
(45) Date of Patent: Jun. 3, 2025

(54) METHODS AND SYSTEMS FOR LIGHT BASED ACCIDENTAL SCAN AVOIDANCE (71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/524,206

(22) Filed: Nov. 30, 2023

(51) Int. Cl.
*G06K 7/10* (2006.01)
*G06K 7/14* (2006.01)

(52) U.S. Cl.
CPC ....... *G06K 7/10732* (2013.01); *G06K 7/1486* (2013.01)

(58) Field of Classification Search
CPC .................. G06K 7/10732; G06K 7/1486
USPC ..................................... 235/462.42
See application file for complete search history.

(56) References Cited

U.S. PATENT DOCUMENTS

| 6,283,375 | B1* | 9/2001 | Wilz, Sr. | G06K 17/0022 235/472.01 |
| 2012/0118963 | A1* | 5/2012 | Drzymala | G06K 7/10722 235/454 |

\* cited by examiner

*Primary Examiner* — Toan C Ly
(74) *Attorney, Agent, or Firm* — Yuri Astvatsaturov (57) ABSTRACT

Methods and systems for avoidance of unintended indicia scanning are disclosed herein. An example method may comprise: (1) illuminating, via a first illumination assembly, a predefined region; (2) illuminating, via a second illumination assembly, outside the predefined region, (3) capturing, via an imaging assembly, image data taken over a field of view (FOV), the FOV partially overlapping first illumination light projected from the first illumination assembly and second illumination light from the second illumination assembly; (4) analyzing, via a controller, the image data; (5) causing, when an object is determined to appear within a working range of the at least one FOV and is illuminated with the second illumination light, the indicia reader to operate pursuant to a first set of operating parameters; and (6) causing, when the object is determined to appear within a working range of the at least one FOV and is not illuminated with the second illumination light, the indicia reader to operate pursuant to a second set of operating parameters.

19 Claims, 5 Drawing Sheets

METHODS AND SYSTEMS FOR LIGHT BASED ACCIDENTAL SCAN AVOIDANCE

BACKGROUND

As quality and precision improve, imagers scan objects faster and more accurately, which is particularly noticeable when scanning indicia and other features on objects. Further, the push toward utilizing high-definition imaging technology allows imagers to deploy a larger field of view capturing images over a greater expanse. However, such performance enhancements present new, unintended technical problems. When swiping an object over a field of view, an imager may now (and undesirably) capture images of an object/indicia before the indicia is selected by a user for scanning. Those objects may then be selected by the user and intentionally scan, causing images of the indicia to be processed multiple times by the system. The result is the generation of duplicative object images, increased demands on image processing, and bottlenecking of data buses between processors. There exists a need for systems that avoid unintended object imaging, in particular indicia and other feature imaging.

SUMMARY

In an embodiment, the present invention may be an indicia reader having a predefined region, the indicia reader comprising: (1) a housing; (2) an imaging assembly positioned at least partially within the housing, the imaging assembly having at least one field of view (FOV); (3) a first illumination assembly configured to provide a first illumination light to the predefined region, the first illumination light overlapping at least partially with the at least one FOV; (4) a second illumination assembly configured to provide a second illumination light to illuminate outside the predefined region, the second illumination light overlapping at least partially with the at least one FOV; and (5) a controller configured to: (a) analyze image data captured by the imaging assembly; (b) responsive to determining that an object, appearing within a working range of the at least one FOV, is illuminated with the second illumination light, causing the indicia reader to operate pursuant to a first set of operating parameters; and (c) responsive to determining that the object, appearing within the working range of the at least one FOV, is not illuminated with the second light, causing the indicia reader to operate pursuant to a second set of operating parameters.

In some embodiments, the predefined region is a product scanning region associated with a bioptic scanner.

Further, in some embodiments, the second set of parameters includes: decoding indicia located on the object to create decode data; and transmitting the decode data to a host server.

Also, in some embodiments, the first set of parameters includes one of not decoding indicia located on the object or not transmitting decoded indicia data to a host system.

In some embodiments, the first illumination light is projected at a first wavelength and the second illumination light is projected at a second wavelength, where the first wavelength and the second wavelength are different.

In some embodiments, the image data comprises a first image frame and a second image frame where the second image frame is captured after the first image frame; the second illumination light assembly is configured to project the second illumination light during the second image frame and not the first image frame; the controller is further configured to analyze the first image frame and the second image frame and compare objects illuminated by the second illumination light in the second image frame that are not illumination in the first image frame; and responsive to the object being illuminated in the second frame and not in the first frame, causing the indicia reader to operate pursuant to a first set of operating parameters.

Further, the controller determines that the object is illuminated by the second illumination light rather than the first illumination light by detecting a second wavelength of light projected by the second illumination assembly, wherein the first illumination assembly projects a light in a first wavelength, the first wavelength being different than the second wavelength.

Alternatively or in addition, when the object is captured in the second image frame and is not illuminated by the second illumination light, then, if indicia is found on the object, the controller is configured to: decode indicia located on the object to create decode data; and transmit the decode data to a host server.

In a further embodiment, the predefined region is defined in space above a platter, wherein an edge of the platter defines an edge of the predefined region; and the edge of the platter abuts a field boundary of the second field of illumination from the second illumination assembly.

In another embodiment, the second illumination assembly is positioned such that at an edge of the second field of illumination is a field boundary which abuts the predefined region.

In an embodiment, the present invention may be a method comprising: (1) illuminating, via a first illumination assembly, a predefined region; (2) illuminating, via a second illumination assembly, outside the predefined region, (3) capturing, via an imaging assembly, image data taken over a field of view (FOV), the FOV partially overlapping first illumination light projected from the first illumination assembly and second illumination light from the second illumination assembly; (4) analyzing, via a controller, the image data; (5) causing, when an object is determined to appear within a working range of the at least one FOV and is illuminated with the second illumination light, the indicia reader to operate pursuant to a first set of operating parameters; and (6) causing, when the object is determined to appear within a working range of the at least one FOV and is not illuminated with the second illumination light, the indicia reader to operate pursuant to a second set of operating parameters.

A further embodiment of the method includes the second set of operating parameters includes: decoding indicia located on the object to create decode data; and transmitting the decode data to a host server.

Another embodiment of the method includes the first set of parameters includes one of not decoding indicia located on the object or not transmitting decoded indicia data to a host system.

Another embodiment method includes the first illumination light is projected at a first wavelength and the second illumination light is projected at a second wavelength, where the first wavelength and the second wavelength are different.

Further embodiments includes steps wherein capturing the image data includes capturing, via the imaging assembly, a first image frame and a second image frame where the second image frame is captured after the first image frame; projecting, via the second illumination light assembly, the second illumination light during the second image frame and not the first image frame; analyzing, via the controller, the first image frame and the second image frame; determining, via the controller, objects illuminated by the second illumination light in the second image frame that are not illumination in the first image frame; and causing, when the object is illuminated in the second frame and not in the first frame, the indicia reader to operate pursuant to a first set of operating parameters.

Further, the method may include determining that the object is illuminated by the second illumination light rather than the first illumination light by detecting a second wavelength of light projected by the second illumination assembly, wherein the first illumination assembly projects a light in a first wavelength, the first wavelength being different than the second wavelength.

Additionally, or alternatively, the method includes when the object captured second image frame and is not illuminated by the second illumination light, then further: decoding indicia located on the object to create decode data; and transmitting the decode data to a host server.

In a further embodiment, the predefined region is defined in space above a platter, wherein an edge of the platter defines an edge of the predefined region; and the edge of the platter abuts a field boundary of a second field of illumination from the second illumination assembly.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
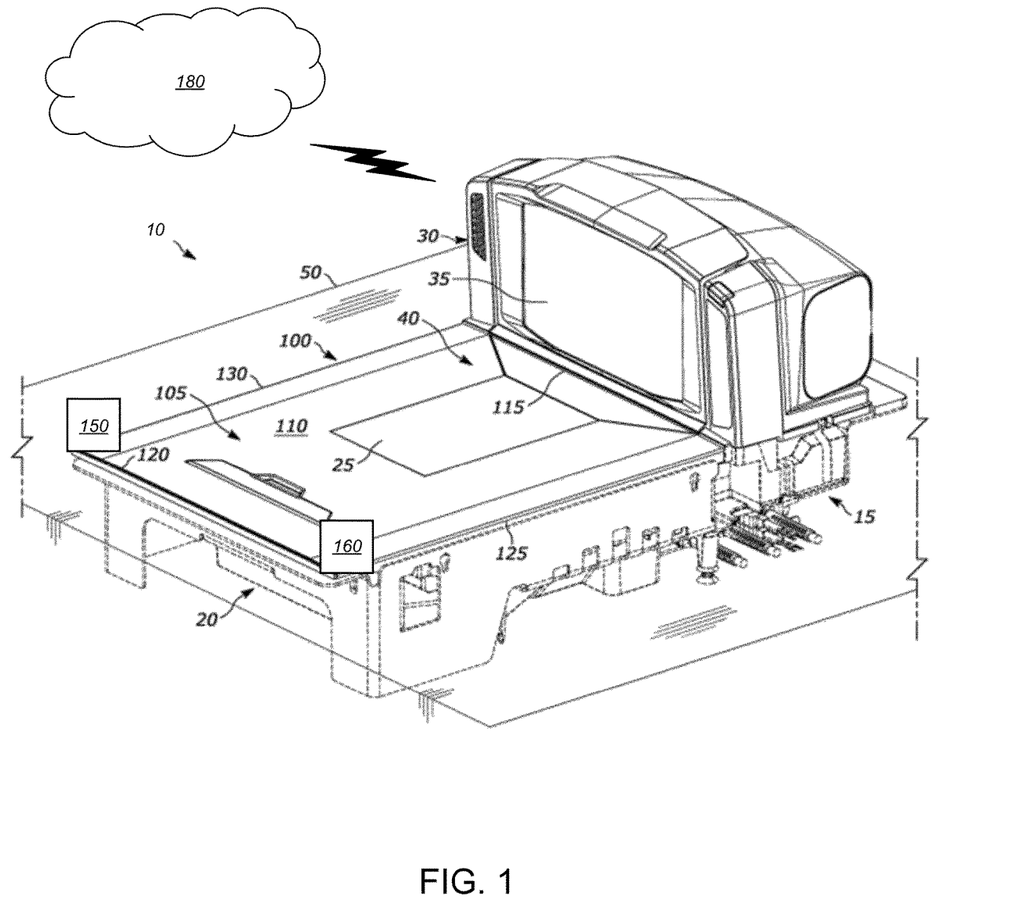
FIG. 1 illustrates an example bioptic image scanner for implementing light based accidental scan avoidance.

Referring to FIG. 1, an example barcode reader 10, such as the Zebra® MP7000 bioptic barcode reader, is shown and can be configured to be supported by a workstation 50, such as a checkout counter at a point-of-sale (POS) of a retail store or a conveyor belt of a grocery store. Barcode reader 10 has a housing 15 that houses an indicia reader 100 and includes a lower housing 20 and an upper housing 30 that extends above lower housing 20. Upper housing 30 includes a generally upright window 35 to allow a first set of housing optical components positioned within housing 15 to direct a first housing field-of-view (FOV) through upright window 35. In addition, if barcode reader 10 is a bioptic barcode reader, barcode reader 10 will include a generally horizontal window 25, which in the example shown is positioned in a weigh platter 105 of weigh platter assembly 100 to allow a second set of housing optical components positioned within housing 15 to direct a second housing FOV through horizontal window 25. The first and second housing FOV are directed at a product scanning region 40 of barcode reader 10 where a user may position a product for scanning at the POS. The POS system may further include a host server 180 configured to receive POS data (otherwise known as decode data or payload data) from the indicia reader 100.

Indicia reader 100 of barcode reader 10 includes a weigh platter 105 and is configured to measure the weight of an object placed on weigh platter 105. Weigh platter 105 has surface 110 that is generally parallel to a top surface of workstation 50 and extends in a first transverse plane, a proximal edge 115, a distal edge 120, a first lateral edge 125, and a second lateral edge 130. In the example shown, proximal edge 115 is adjacent upper housing 30 and would be the edge furthest from a user of the indicia reader 100 and/or barcode reader 10. First and second lateral edges 125, 130 extend non-parallel to proximal edge 115. Distal edge 120 is opposite proximal edge 115, would be the edge closest to the user, and extends non-parallel to first and second lateral edges 125, 130. In the example shown, weigh platter 105 is generally rectangular and first and second lateral edges 125, 130 are perpendicular to proximal edge 115 and distal edge 120 is perpendicular to first and second lateral edges 125, 130 and parallel to proximal edge 115.

FIG. 1 further depicts a first illumination assembly 170 associated with an imaging assembly 150. The depicted embodiment further includes a second illumination assembly 160. In the depicted embodiment, the imaging assembly 150 is positioned along the distal edge 120, in a corner of the indicia reader 100 near the second lateral edge 130. In the depicted embodiment, the second illumination assembly 160 is located along the distal edge 120, near the first lateral edge 125. During operation of the indicia reader 100, the imaging assembly 150 captures image data which is then analyzed for the presence of decodable indicia. If indicia is found, the indicia may be decoded, validated, and transmitted to the host server 180 for processing. Validating decoded indicia data includes checking the accuracy and quality of the data prior to taking a further action with the decoded indicia data. In some embodiments, the decode data may be validated at the indicia reader 100 and then transmitted to the host server 180. In some embodiments, the decode data may be transmitted to the host server 180 and then validated by the host server 180. Issues arise during operation when captured image data contains indicia that a user is not intending to capture at the time of imaging, such as indicia attached to objects that are on a conveyor belt awaiting scanning. The current disclosure describes processes, systems, and devices where unintended captured indicia is located and not decoded or sent to the host server 180.

Figure 2:
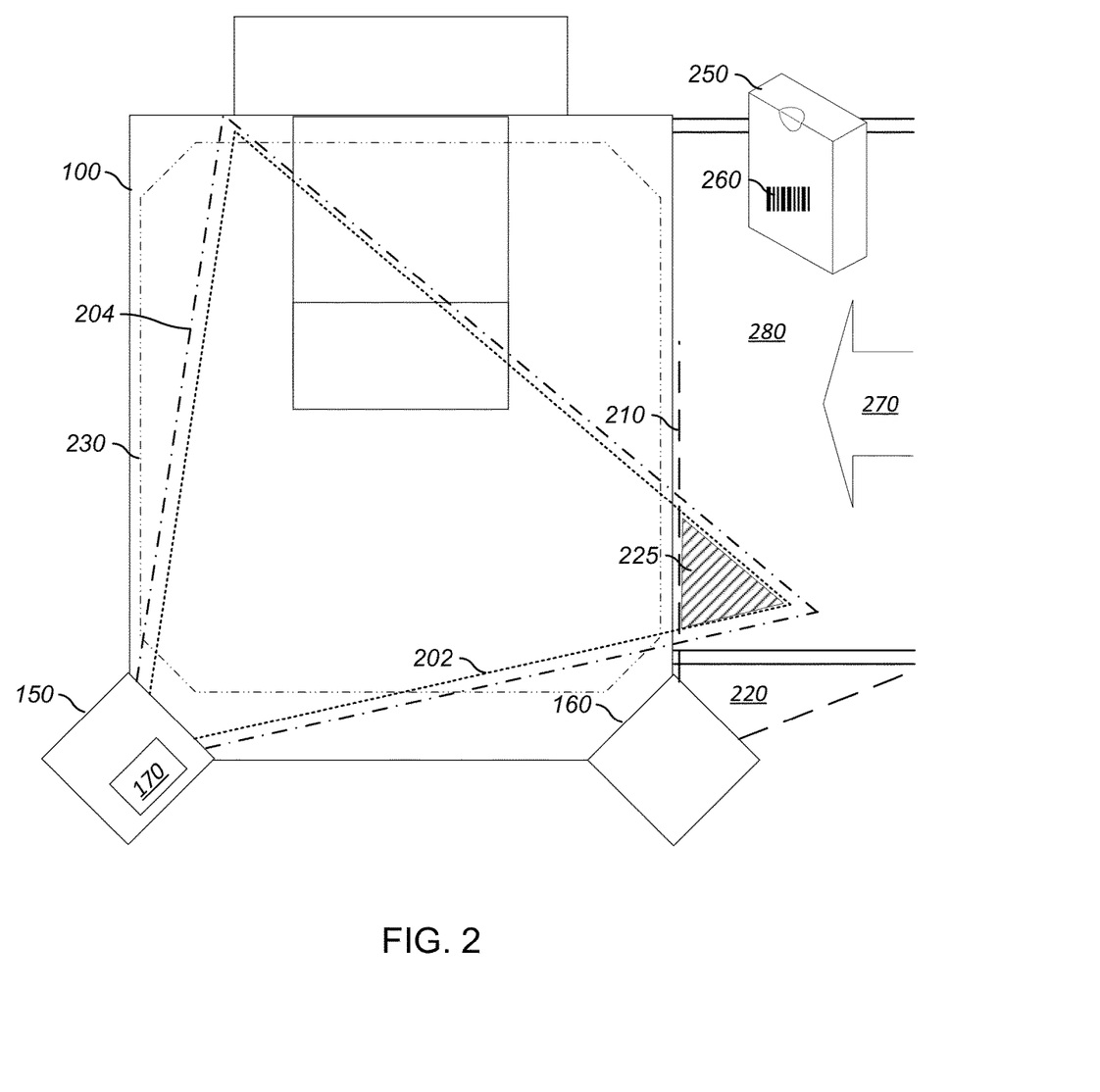
FIG. 2 illustrates an example bioptic image scanning environment with an illumination source located adjacent to the bioptic image scanning surface.

FIG. 2 depicts an example embodiment of the system disclosure herein. FIG. 2 depicts a top-down view of the indicia reader 100 as depicted in FIG. 1. FIG. 2 depicts the imaging assembly 150 having at least one FOV 202 that passes through a predefined region230 above the indicia reader100. FIG. 2 further depicts a first illumination assembly 170 configured to be adjacent to the imaging assembly 150. The first illumination assembly 170 is configured to project light over a first field of illumination 204 (FOI), the first FOI 204 is representative of the area in which the light may be projected. In the embodiment depicted in FIG. 2, the first FOI 204 and the FOV 202 substantially overlap such that the first illumination assembly 170 illuminates the FOV 202 so that the imaging assembly 150 can image objects that fall within the FOV 202. An issue that arises is that both the FOV 202 and the first FOI 204 pass through the predefined region 230 into an area beyond in which imaging is not desired.

The FOV 202 projects through the predefined region 230 above the indicia reader 100. While the FOV 202 is depicted as a triangular shape in FIG. 2, in actuality the FOV 202 may continue to extend away from the imaging assembly 150, The FOV 202 is considered to have a "working range" which is considered to be a distance away from the imaging assembly 150 within the FOV 202 in which image data of an object can still be reliably gathered. In the depicted embodiment, the FOV 202is positioned such that if an object 250 is within the predefined region 230, the object 250 would also be within the FOV 202 and the FOI 204. However, it is possible for the object 250 to be positioned outside the predefined region 230 and within the FOV 202 of the imaging assembly 150. In practice within retail environments, this may result in objects 250 upon a conveyor belt 280, moving from a direction 270, being imaged before a user is ready to image said object 250.

As shown in FIG. 2, a second illumination assembly 160 is configured to project light over a second field of illumination 220. The second illumination assembly 160 is positioned such that the second FOI 220 only projects outside of the predefined region 230. The second FOI 220 includes a field boundary 210 along an edge of the second FOI 220, the field boundary 210 is adjacent to the predefined region 230. FIG. 2 depicts an overlap region 225 in the area covered by both the first FOI 204 and the second FOI 220. The overlap region 225 is representative of space where an object may be located where the object is within the first FOV 202 of the imaging assembly 150 while not being in the predefined region where the object 250 is not intended to be imaged. While the operator of the indicia reader 100 may continue to choose objects 250 to purposely image, the conveyor belt 280 may continue to bring objects 250 into the overlap region 225. While the conveyor belt 280 is shown in FIG. 2, it is appreciated that any surface adjacent to the indicia reader 100 can be element 280, such as a flat surface to unload items prior to scanning or a bagging area. A goal of the system described herein is to determine if indicia 260 located on object 250 is located in the predefined region 230, e.g. an area where it is desirable to read the indicia in comparison to indicia located in the overlap region 225.

As depicted in FIG. 2, the second illumination assembly 160 projects light over the second FOI 220 and any possible items (item 250) within FOI220. The imaging assembly 150 may be used to capture images which are analyzed to determine if the item 250 is within second FOI 220 by determining if the projected light from the second illumination 160 is projected upon the item 250. In other words, if light projected from the second illumination assembly 160 is determined to be displayed over the item 250, then the item 250 is within region 220 and should not be scanned. Examples of how the presence of projected light can be determined includes projecting a particular wavelength of light that is detectable by the imaging assembly 150, or a light pattern that is detected by the imaging assembly 150. In the depicted embodiment, the light projected from the first illumination assembly 170 is projected at a first wavelength and the light projected from the second illumination assembly 160 is at a second wavelength, where there first wavelength and the second wavelength are different. In one embodiment, the first wavelength is in the visible light spectrum and the second wavelength is infrared. Also, a single image frame can be captured by the imaging assembly 150 and the presence (or lack thereof) of a specific wavelength of light could be determined or one image frame could be captured with no second illumination assembly 160 on and then a second image frame could be captured immediately after with second illumination assembly 160 on. In this embodiment, the first image frame is used for decoding indicia and the second image frame is used to detect the presence of light projected from second illumination assembly 160.

Figure 3:
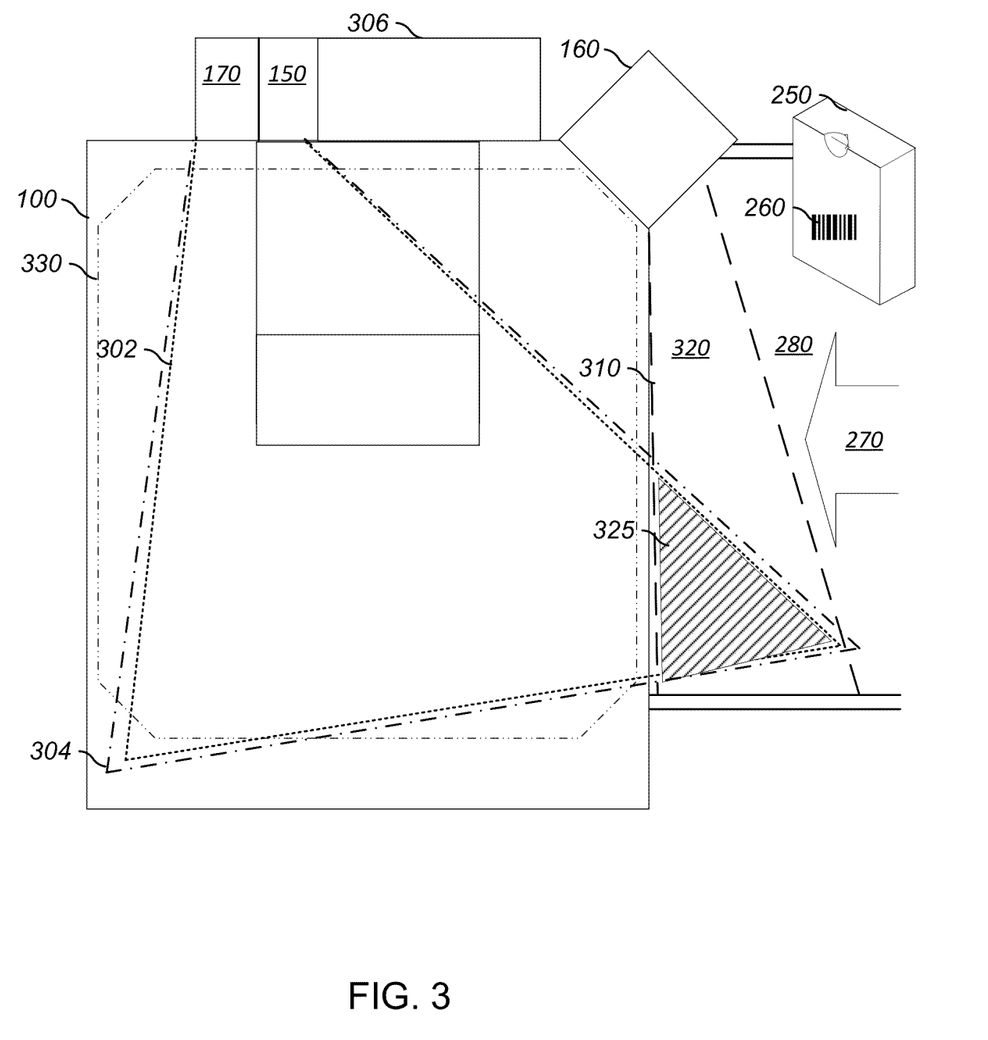
FIG. 3 illustrates an example bioptic image scanning environment with an illumination source located upon the bioptic image scanning surface.

FIG. 3 depicts another example embodiment of the system disclosure herein. FIG. 3 depicts a top-down view of the indicia reader 100 as depicted in FIG. 1 in which the imaging assembly 150 and the first illumination element 170 are adjacent to each other. As depicted, the imaging assembly 150 features a FOV 302 extending through a predefined space 330 over the indicia reader 100. In the depicted embodiment, the predefined space 330 is an area where a user of the indicia reader 100 positions an object 250 to image possible indicia located on the object 250.

As depicted in FIG. 3, the imaging assembly 150 further includes a first illumination assembly 170, similarly to FIG. 2. As depicted in FIG. 3, the imaging assembly 150 and the first illumination assembly 170 are contained within housing 306. In the depicted embodiment, the housing 306 is a vertical tower element of a bi-optical scanner. In the depicted embodiment, the first illumination assembly 170 is configured to project light within a first FOI 304. The goal of the first illumination assembly 170 is to project light onto surfaces to be imaged by the imaging assembly 150. As depicted, the first FOI 304 is slightly larger than the FOV 302 such that the FOV 302 is illuminated during operation. FIG. 3 further depicts a second illumination assembly 160 which projects a light pattern over a second field of illumination 320. The second FOI 320 is configured to align such that a FOI boundary 310 is adjacent to the predefined region 330, this ensures that there is no overlap between the second FOI 320 and the predefined region 330. In other words, if an object is found to be completely within the second FOI 320, then the object cannot also be completely within the predefined region 330. The second FOI 320 overlaps partially with the first FOI 304, forming overlap region 325. If object 250 was present in the overlap region 325, then the object 250 may also be within the FOV 302 and imageable by the imaging assembly 150. In a further embodiment, the second illumination assembly 160 as depicted in FIG. 3 is located on an opposite side of the conveyor belt 280 (similar to the location of the second illumination assembly 160 as seen in FIG. 2.) When the second illumination assembly 160 is positioned opposite the conveyor belt 280 from the position shown in FIG. 3, the second FOI 320 results in the overlap region 325.

Figure 4:
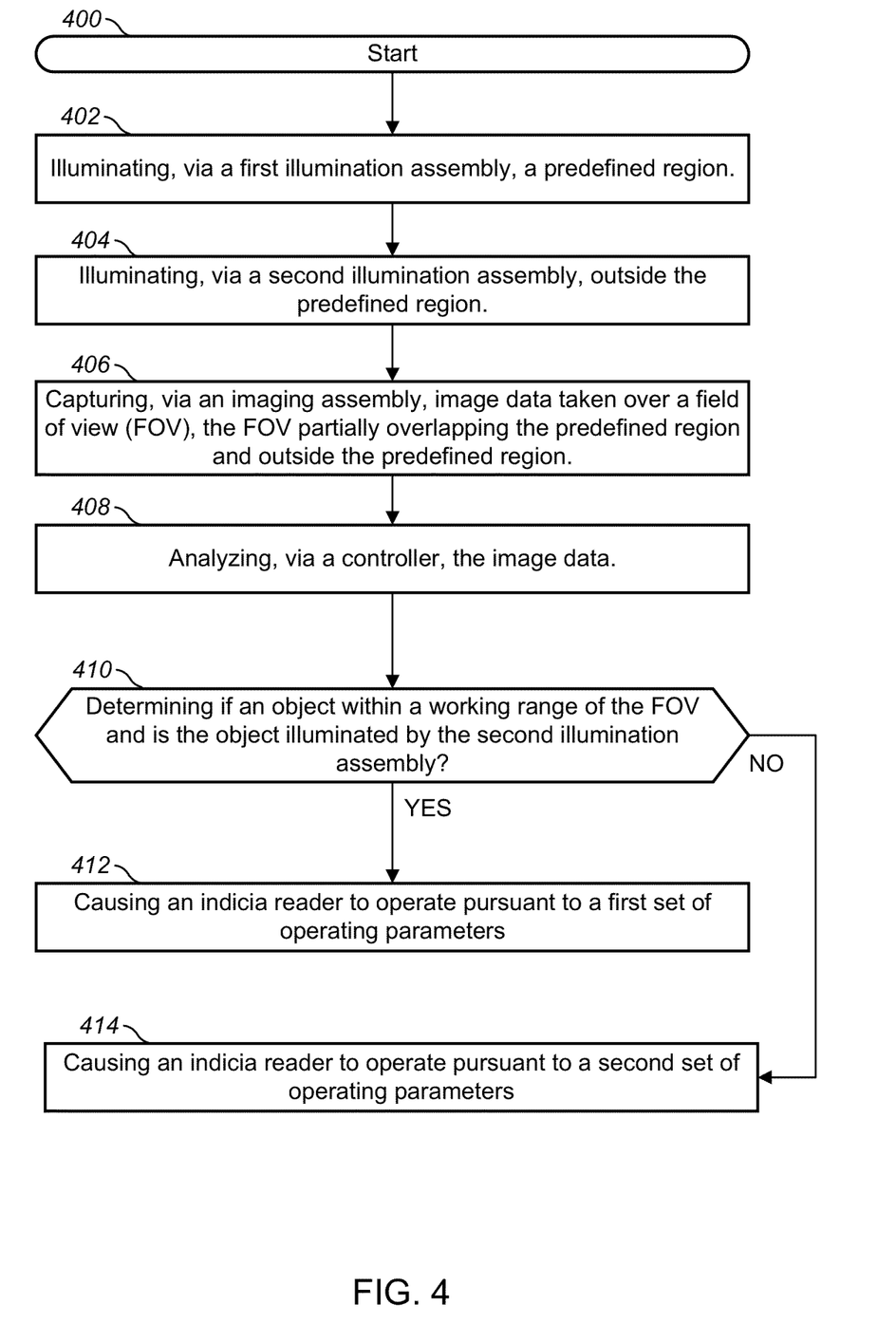
FIG. 4 is a block diagram of an example flowchart for implementing example methods and/or operations described herein.

It is desirable to use the light projected from the second illumination assembly 160 to determine if items within the second FOV 302 (and capturable by the imaging assembly 150) also fall within the overlap region 325. The process for determining if an object is within the overlap region 325 will be further explained below. FIG. 4 illustrates a flowchart depicting a method using the above-described elements. Step 402 includes illuminating, via a first illumination assembly, a predefined region. Step 402 includes where the first illuminating assembly 170 projects a light over the first FOI 204. In comparing FIGS. 2 and 3, it is noted that the location of the first illumination assembly can be in a variety of place around the predefined region 230. The first illumination assembly 170 is configured to provide illumination for the imaging assembly 150.

Step 404 includes illuminating, via a second illumination assembly 160, outside the predefined region. The second illumination assembly 160 is configured to project illumination over the second FOI 220, the second FOI 220 directed away from the predefined region 230 to ensure that any objects within the second FOI 220 is not also within the predefined region 230.

Step 406 includes capturing, via the imaging assembly 150, image data taken over a field of view (FOV), the FOV 202 partially overlapping the predefined region 230 and outside the predefined region. In other words, as described above, the FOV 202 extends past the edges of the predefined region 230 where it then overlaps with the second FOI 220. Any object located within the FOV 202 and the second FOI 220 (within the overlap region 225) may be unintentionally in the image data.

Step 408 includes analyzing, via a controller, the image data. The image data is analyzed for the presence of an object 250 with the working range of the FOV 202. In one embodiment the working range is as depicted by the FOV 202. If any object 250 is located within the FOV 202, it may be determined if the object 250 is within the predefined region 230 or the overlap region 225.

Step 410 includes determining if an object is within a working range of the FOV and is the object illuminated by the second illumination assembly. This step requires a determination from which the next step will be chosen. If an object within the working range of the FOV 202 and is within the second FOI, then the method continues to step 412. However, if the object is located within the FOV 202 and outside of the second FOI, then the method continues to step 414. In determining whether the object 250 is within the second FOI 220, the image data is analyzed to determine if light omitted from the second illumination assembly 160 is present on the object 250. In the depicted embodiment, the analysis is done by attempting to detect a particular wavelength of light omitted from the second illumination assembly 160. In another embodiment, the image data is captured over multiple image frames, wherein for the first image frame the second illumination assembly 160 is not on and illuminating and for the second image frame the second illumination assembly 160 is on and illuminating. By comparing the first image frame to the second image frame, an object within the second FOI 220 is not illuminated in the first frame and is illuminated in the second.

Step 412 occurs when the object 250 is within the working range of the FOV 202 and is within the second FOI 220. Step 412 includes causing an indicia reader to operate pursuant to a first set of operating parameters. As mentioned above, if the object 250 is present in the FOV 202 and the second FOI 220, then the object 250 is not in the predefined region and is not to be decoded and/or transmitted. In the depicted embodiment, the first set of operating parameters includes either not decoding indicia 260 located on the object 250 or decoding the indicia 260 and not transmitting the decode data to the host, otherwise known as payload data.

Step 414 occurs if the object is located within the FOV 202 and outside of the second FOI 220. Step 414 includes causing an indicia reader to operate pursuant to a second set of operating parameters. In this scenario, the object 250 is located within the predefined region and is needing to be imaged. In the depicted embodiment, indicia 260 is detected on object 250 and is decoded to produce indicia data. In some embodiment, the indicia reader 100 may then validates the indicia data. When the object is within the predefined region, then the POS system receives the payload data. In some embodiments, the indicia data can also be validated by comparing information concerning the object 250 to information associated with the indicia data. For example, the indicia data is associated with a box of cereal, the validation step would be to analyze the object 250 within the image data to confirm that it is the same box of cereal. In other embodiments, the validation step may not be done.

Figure 5:
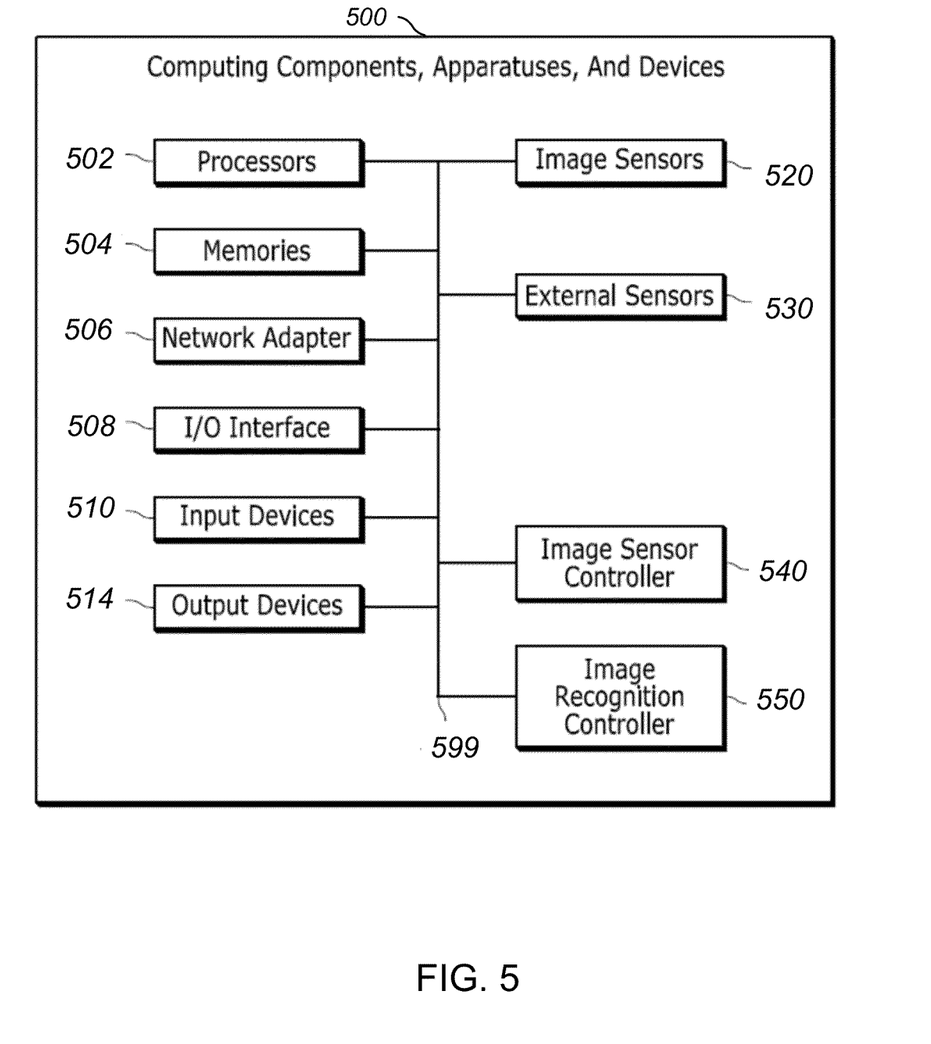
FIG. 5 is a block diagram of internal components of a bioptic image scanning device described herein.

FIG. 5 illustrates example components, apparatuses, and devices 500 that may be used for implementing the methods and systems for avoidance of unintended indicia scanning. The example components, apparatuses, and devices 500 may include one or more processors 502, one or more memories 504, one or more network adapters 506, one or more input/output (I/O) interfaces 508, one or more input devices 510, one or more output devices 514, one or more image sensors 520, one or more external sensors 530, one or more image sensor controllers 540, and/or one or more image recognition controllers 550. Any of the exemplary computing components, apparatuses, and devices 500 may be communicatively coupled to one another via a communication bus 599.

The one or more processors 502 may be, or may include, one or more central processing units (CPU), one or more coprocessors, one or more microprocessors, one or more graphical processing units (GPU), one or more digital signal processors (DSP), one or more application specific integrated circuits (ASIC), one or more programmable logic devices (PLD), one or more field-programmable gate arrays (FPGA), one or more field-programmable logic devices (FPLD), one or more microcontroller units (MCUs), one or more hardware accelerators, one or more special-purpose computer chips, and one or more system-on-a-chip (SoC) devices, etc.

The one or more memories 504 may be, or may include, any local short-term memory (e.g., random access memory (RAM), read only memory (ROM), cache, etc.) and/or any long term memory (e.g., hard disk drives (HDD), solid state drives (SSD), etc.). The one or more memories 504 may be communicatively coupled to the one or more processors 502.

The one or more network adapters 506 may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.).

The one or more I/O interfaces 508 may be, or may include, any number of different types of I/O units and/or combined I/O circuits and/or I/O components that enable the one or more processors 502 to communicate with the one or more input devices 512 and/or the one or more output devices 514. The one or more input devices 512 may be, or may include, keyboards and/or keypads, interactive screens (e.g., touch screens), navigation devices (e.g., a mouse, a trackball, a capacitive touch pad, a joystick, etc.), microphones, buttons, communication interfaces, etc. The one or more output devices 514 may be, or may include display units (e.g., display screens, receipt printers, etc.), speakers, etc. The one or more I/O interfaces 508 may also be, or may include digital applications (e.g., local graphical user interfaces (GUIs)).

The one or more image sensors 520 may be, or may include, any image capturing device, unit, and/or component capable of capturing image data of a particular field of view (FOV) of the one or more image sensors 520. The image data may be, or may include, any electromagnetic data relating to the FOV (e.g., reflected light beams in a scanner, a digital image in the visible spectrum, a digital image in the infrared spectrum, etc.) that can be digitally stored or converted into data capable of digital storage. The term "image data" may refer to raw image data and/or lightly processed image data (e.g., compressed raw image data, scaled raw image data, time stamped raw image data, etc.). Additionally, "image data" may include data related to one or more images (e.g., one or more digital photographs, a burst photograph, a digital recording, etc.) including one or more image frames. In some embodiments, the one or more image sensors 520 may have a plurality of photosensitive elements that define a substantially flat surface that may also feature other components (e.g., a housing, lens(es), etc.) for capturing image data over the FOV. The arrangement and configuration of these components may define the FOV. It should be noted, that while the one or more image sensors 520 is described as capturing the image data over a particular FOV, the FOV can be split into multiple sub-fields of view (sub-FOV). Data captured through the sub-FOV of an one or more image sensors 520 would still be considered image data that is captured over the FOV of the one or more image sensors 520. In some embodiments, the one or more image sensors 520 may be communicatively coupled to the one or more processors 502 via a dedicated communication bus (e.g., communication bus 599).

The one or more external sensors 530 may be, or may include, one or more light sensors, one or more proximity sensors, one or more motion sensors, and/or one or more weight scales. The one or more external sensors 530 may be communicatively coupled to one or more processors 502 and/or the one or more image sensos 520. In some embodiments, the one or more external sensors 530 may engage the one or more image sensors 520 upon triggering via an external input. For example, an object may be placed on a weight scale which is also in the FOV of the one or more image sensors 520. The weight scale may then determine a change in weight and transmit a signal to the one or more image sensors 520 to capture an image of the object. It should be noted that other techniques, systems, and methods may be employed to engage the one or more image sensors 520, such as mechanical activation (e.g., the trigger of a hand-held barcode scanner), a timing mechanism, and/or the like.

The one or more image sensor controllers 540 and/or the one or more image recognition controllers 550 may be, or may include, computer-readable, executable instructions that may be stored in the one or more memories 504 and/or performed by the one or more processors 502. Further, the computer-readable, executable instructions of the one or more camera controllers 540 and/or the one or more image recognition controllers 550 may be stored on and/or performed by specifically designated hardware (e.g., micro controllers, microchips, etc.) which may have functionalities similar to the one or more memories 504 and/or the one or more processors 502.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reader having a predefined region, the indicia reader comprising:
   a housing;
   an imaging assembly positioned at least partially within the housing, the imaging assembly having at least one field of view (FOV);
   a first illumination assembly configured to provide a first illumination light to the predefined region, the first illumination light overlapping at least partially with the at least one FOV;
   a second illumination assembly configured to provide a second illumination light to illuminate outside the predefined region, the second illumination light overlapping at least partially with the at least one FOV; and
   a controller configured to:
      analyze image data captured by the imaging assembly;
      responsive to determining that an object, appearing within a working range of the at least one FOV, is illuminated with the second illumination light, causing the indicia reader to operate pursuant to a first set of operating parameters; and
      responsive to determining that the object, appearing within the working range of the at least one FOV, is not illuminated with the second light, causing the indicia reader to operate pursuant to a second set of operating parameters.

2. The indicia reader of claim 1, wherein the predefined region is a product scanning region associated with a bioptic scanner.

3. The indicia reader of claim 1, wherein the second set of parameters includes:
   decoding indicia located on the object to create decode data; and
   transmitting the decode data to a host server.

4. The indicia reader of claim 1, wherein the first set of parameters includes one of not decoding indicia located on the object or not transmitting decoded indicia data to a host system.

5. The indicia reader of claim 1, wherein the first illumination light is projected at a first wavelength and the second illumination light is projected at a second wavelength, where the first wavelength and the second wavelength are different.

6. The indicia reader of claim 1, wherein:
   the image data comprises a first image frame and a second image frame where the second image frame is captured after the first image frame;
   the second illumination light assembly is configured to project the second illumination light during the second image frame and not the first image frame;
   the controller is further configured to analyze the first image frame and the second image frame and compare objects illuminated by the second illumination light in the second image frame that are not illumination in the first image frame; and
   responsive to the object being illuminated in the second frame and not in the first frame, causing the indicia reader to operate pursuant to a first set of operating parameters.

7. The indicia reader of claim 6, wherein the controller determines that the object is illuminated by the second illumination light rather than the first illumination light by detecting a second wavelength of light projected by the second illumination assembly, wherein the first illumination assembly projects a light in a first wavelength, the first wavelength being different than the second wavelength.

8. The indicia reader of claim 6, wherein when the object is captured in the second image frame and is not illuminated by the second illumination light, then, if indicia is found on the object, the controller is configured to:
   decode indicia located on the object to create decode data; and
   transmit the decode data to a host server.

9. The indicia reader of claim 1, wherein the predefined region is defined in space above a platter, wherein an edge of the platter defines an edge of the predefined region; and
   the edge of the platter abuts a field boundary of the second field of illumination from the second illumination assembly.

10. The indicia reader of claim 1, wherein the second illumination assembly is positioned such that at an edge of the second field of illumination is a field boundary which abuts the predefined region.

11. A method comprising:
   illuminating, via a first illumination assembly, a predefined region;
   illuminating, via a second illumination assembly, outside the predefined region,
   capturing, via an imaging assembly, image data taken over a field of view (FOV), the FOV partially overlapping first illumination light projected from the first illumination assembly and second illumination light from the second illumination assembly;
   analyzing, via a controller, the image data;
   causing, when an object is determined to appear within a working range of the at least one FOV and is illuminated with the second illumination light, the indicia reader to operate pursuant to a first set of operating parameters; and
   causing, when the object is determined to appear within a working range of the at least one FOV and is not illuminated with the second illumination light, the indicia reader to operate pursuant to a second set of operating parameters.

12. The method of claim 11, wherein the predefined region is a product scanning region associated with a bioptic scanner.

13. The method of claim 11, wherein the second set of operating parameters includes:
   decoding indicia located on the object to create decode data;
   transmitting the decode data to a host server.

14. The method of claim 11, wherein the first set of parameters includes one of not decoding indicia located on the object or not transmitting decoded indicia data to a host system.

15. The method of claim 11, wherein the first illumination light is projected at a first wavelength and the second illumination light is projected at a second wavelength, where the first wavelength and the second wavelength are different.

16. The method of claim 11, wherein capturing the image data comprises:
   capturing, via the imaging assembly, a first image frame and a second image frame where the second image frame is captured after the first image frame;
   projecting, via the second illumination light assembly, the second illumination light during the second image frame and not the first image frame;
   analyzing, via the controller, the first image frame and the second image frame;
   determining, via the controller, objects illuminated by the second illumination light in the second image frame that are not illumination in the first image frame; and
   causing, when the object is illuminated in the second frame and not in the first frame, the indicia reader to operate pursuant to a first set of operating parameters.

17. The method of claim 16, wherein determining that the object is illuminated by the second illumination light rather than the first illumination light by detecting a second wavelength of light projected by the second illumination assembly, wherein the first illumination assembly projects a light in a first wavelength, the first wavelength being different than the second wavelength.

18. The method of claim 16, wherein when the object captured second image frame and is not illuminated by the second illumination light, then further:
   decoding indicia located on the object to create decode data; and
   transmitting the decode data to a host server.

19. The method of claim 11, wherein the predefined region is defined in space above a platter, wherein an edge of the platter defines an edge of the predefined region; and
   the edge of the platter abuts a field boundary of a second field of illumination from the second illumination assembly.

* * * * *